(12) United States Patent
Hansen

(10) Patent No.: US 7,131,806 B2
(45) Date of Patent: Nov. 7, 2006

(54) GROMMET AND ANCHORING STRUCTURE

(75) Inventor: Wayne M. Hansen, Chippewa Falls, WI (US)

(73) Assignee: Illinois Tool Works Inc, Glenview, IL (US)

( * ) Notice: Subject to any disclaimer, the term of this patent is extended or adjusted under 35 U.S.C. 154(b) by 29 days.

(21) Appl. No.: 11/096,936

(22) Filed: Apr. 1, 2005

(65) Prior Publication Data
US 2006/0000959 A1   Jan. 5, 2006

Related U.S. Application Data

(60) Provisional application No. 60/584,604, filed on Jul. 1, 2004.

(51) Int. Cl.
  F16B 13/04  (2006.01)
  A47B 96/00  (2006.01)
(52) U.S. Cl. ............... 411/41; 248/220.31; 248/221.11; 248/222.12; 411/48; 411/500
(58) Field of Classification Search .................. 411/41, 411/45, 48, 500, 508, 71, 80.2; 24/136 K, 24/136 R, 297, 453, 115 M; 248/221.1, 248/221.11, 312, 312.1, 314, 220.41, 42, 248/222.41, 222.21, 239, 222.12, 230.1, 248/220.43; 403/326, 329
See application file for complete search history.

(56) References Cited

U.S. PATENT DOCUMENTS 2,542,144 A * 2/1951 Kearns ..................... 411/41
2,941,439 A * 6/1960 Rapata ...................... 411/41
4,276,806 A * 7/1981 Morel ....................... 411/41
4,952,106 A * 8/1990 Kubogochi et al. ....... 411/48
5,163,795 A * 11/1992 Benoit et al. .............. 411/45
5,375,954 A * 12/1994 Eguchi ...................... 411/48
6,616,479 B1 * 9/2003 Jones ....................... 439/567
6,769,849 B1 * 8/2004 Yoneoka ................... 411/45

FOREIGN PATENT DOCUMENTS

EP      0648 944    9/1994
EP      0 886010    5/1998
GB      2088986     10/1981

* cited by examiner

Primary Examiner—Carl D. Friedman
Assistant Examiner—Tan Le
(74) Attorney, Agent, or Firm—Paul F. Donovan; Mark W. Croll

(57) ABSTRACT

An anchoring structure for components such as a ball-stud grommet includes a head and a plurality of retention legs defining lips in spaced, confronting relationship with a surface of the head. The legs are arranged in a circle and are provided in sufficient number and in sufficiently close spaced relation that at least one leg on opposite sides engage edges of a slot for any rotational position of the fastener relative to the slot.

20 Claims, 2 Drawing Sheets

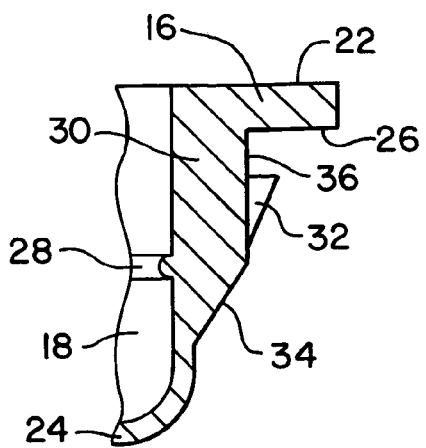
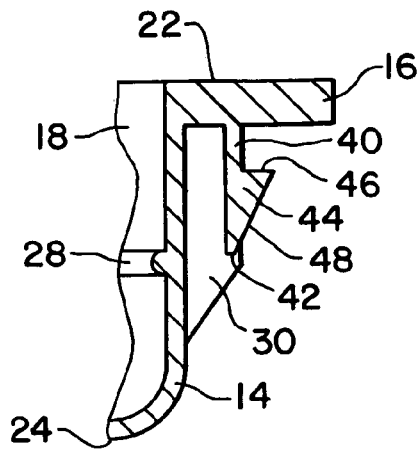
Fig. 3
Fig. 4
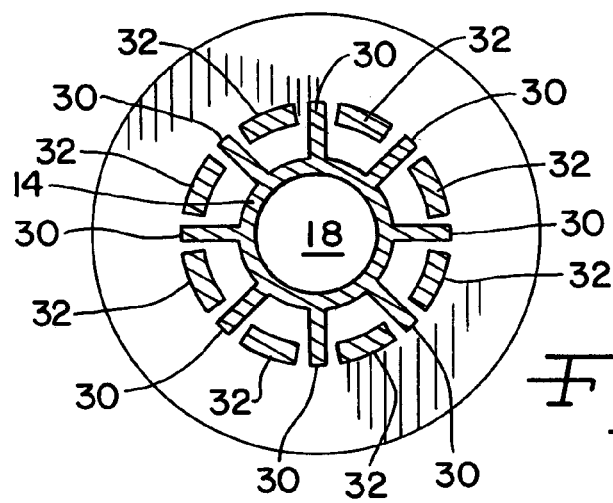
Fig. 5
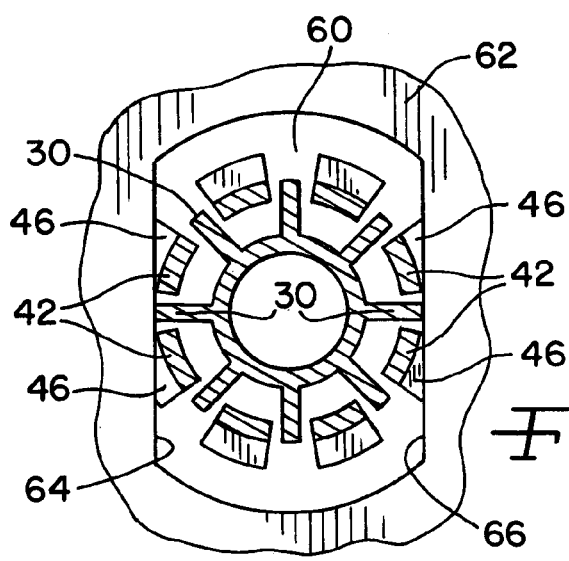
Fig. 6

GROMMET AND ANCHORING STRUCTURE

CROSS-REFERENCE TO RELATED APPLICATIONS

The present United States Patent Application claims the benefits of U.S. Provisional Application Ser. No. 60/584,604 filed Jul. 1, 2004.

FIELD OF THE INVENTION

The present invention relates generally to push-in components in fastening systems, including grommets; and, more particularly, to a ball-stud grommet suitable for anchoring in a slot or a hole for use in a blind assembly arrangement.

BACKGROUND OF THE INVENTION

In the assembly of snap-fit components, it is necessary to account for build variation in component location. Build variation is the stack-up of tolerances between fastener locations when two different processes are used to locate the fasteners in each component. For example, an interior door trim on an automobile may have up to ten snap-fit fasteners protruding from the back surface that are designed to have blind lead-in and assembly to ten matching holes in the sheet metal of the vehicle. Because the processes are different between the manufacturing of the door panel (often molded) and the manufacturing of the sheet metal (often punched holes) there will be variations in the locations of the holes relative to each other. To allow for assembly of the door panel to the sheet metal, the blind fasteners used between the holes of the door panel and the holes of the sheet metal are allowed to float in oversize holes on the door panel. A 1.0 to 2.0 mm float will account for build variations between the two components and has worked successfully for the installation of automobile interior door trim.

Other assemblies cannot allow float in the blind attachment arrangement due to the fit and function requirements of the components being assembled. One example of such is the attachment of vehicle tail lamps and headlamps. The components for headlamps and tail lamps require solid attachment to the sheet metal of the vehicle so that proper adjustment, positioning and aim of the lights are achieved and maintained. The use of all floating fasteners is not feasible for these types of installations. To overcome the issues surrounding build variation, tail lamps and head lamps are known to be attached at one six-way locating position (a hole) and at up to three four-way locating positions (slots). Known fasteners are configured for either holes or slots, with different fasteners used for holes (circular) and for slots (elongated). Assembly plants must maintain inventories of each, and provide each to the proper place for installation.

Another problem is encountered in some situations with known elongated fasteners secured in slots. To insert the fastener into the slot, it is necessary to properly align the fastener with the elongated slot. If the longitudinal axis of the fastener and the longitudinal axis of the slot are not aligned properly, the fastener cannot be inserted into the slot or will be inserted with great difficulty, perhaps even damaging the anchoring portion of the fastener.

Known fasteners used in holes are circular, with four anchoring legs. Circular fasteners of this type will not work well in slots. The fastener is secure only if opposed anchoring legs are transverse to the axial direction of the slot. If not, the fastener will become loose and can fall from the slot.

A preferred blind fastener can be anchored regardless of the orientation of the fastener. Blind fasteners allow for the preassembly of components and shipment of the all parts in the assembly. If a single anchoring part is used between two components, the anchoring part is assembled in one of the components, generally aligned with the anchoring location of the other components and simply pressed together. When a two-part fastener is used, one part of the fastener is located in one component and the other part of the fastener is located in the other component, with the fastener parts generally located and pressed together during final assembly. Alternatively, one component can have an assembled fastener connected to it and subsequently aligned with the other component and pushed together. Again, in any of these situations, a preferred blind fastener does not require positioning or orientation relative to the anchoring hole, but merely general alignment therewith and compression for attachment. Preferred blind fasteners can be attached from one side of the components without having to attach or modify the items from the opposite side of the components.

A preferred fastener offers rigid attachment across both holes and slots, can be provided as a part in assembly attached to one component and allows for good lead-in and assembly.

SUMMARY OF THE INVENTION

The present invention provides a push in fastening component that is symmetric, with no orientation required for insertion in either holes or slots.

In one aspect thereof, the present invention provides a fastening component securable in both a circular hole and an elongated slot. The component has a central body, a head at one end of the body and a plurality of retention legs. Each leg has a lip disposed in confronting spaced relation to a surface of the head. The retention legs are arranged in a circle and include a sufficient number thereof spaced sufficiently close that lips of legs on opposite sides engage parallel edges of a slot for any rotational position of the component.

In another aspect thereof, the present invention provides a ball-stud anchoring grommet securable in both a circular hole and an elongated slot. The grommet has a central body with a cavity and an internal feature for securing a ball end of a ball-stud. A head at one end of the body has an opening to the cavity. A plurality of retention legs, each having a lip in confronting, spaced relation to a surface of the head, are arranged in a circle around the body. The plurality of retention legs includes a sufficient number of legs spaced sufficiently close that, for any rotational position of the grommet, at least a lip of a leg on one side of the body and a lip of a leg on an opposite side of the body engage edges of an elongated opening receiving the grommet.

In a further aspect thereof, the present invention provides an anchoring structure for a component securable in both a circular hole and an elongated slot. The structure has a head and a plurality of retention legs arranged in a circle and connected to the head. Each leg of the plurality of legs has a lip disposed in confronting spaced relation to a surface of the head. The plurality of retention legs includes a sufficient number of legs spaced sufficiently close that, for any rotational position of the component, a lip of a leg on one side of the plurality of legs and a lip of a leg on an opposite side of the plurality of legs engage opposite edges of a slot receiving the component.

An advantage of the present invention is providing a fastener component that can be inserted in either holes or slots, thereby reducing the number of different parts that need to be stocked for completing assemblies.

Another advantage of the present invention is providing a ball-stud anchoring grommet that is easy to install without the use of tools, and which can be installed in a blind assembly with only minimal gross orientation necessary for completing the assembly.

Still another advantage of the present invention is providing an anchoring structure suitable for use on a variety of components, for securing the components in either slots or holes.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 is a fragmentary cross-sectional view of the grommet shown in the preceding drawings, the cross-section taken through one of the locating ribs of the grommet;

FIG. 4 is a fragmentary cross-sectional view similar to that of FIG. 3, but taken through one of the anchoring legs of the grommet;

FIG. 5 is a cross-sectional view of the grommet shown in FIG. 1, taken along line 5—5 of FIG. 1; and FIG. 6 is a cross-sectional view of the grommet shown in FIG. 1 taken along line 6—6 of FIG. 1, and illustrating the grommet installed in an elongated slot.

Figure 1:
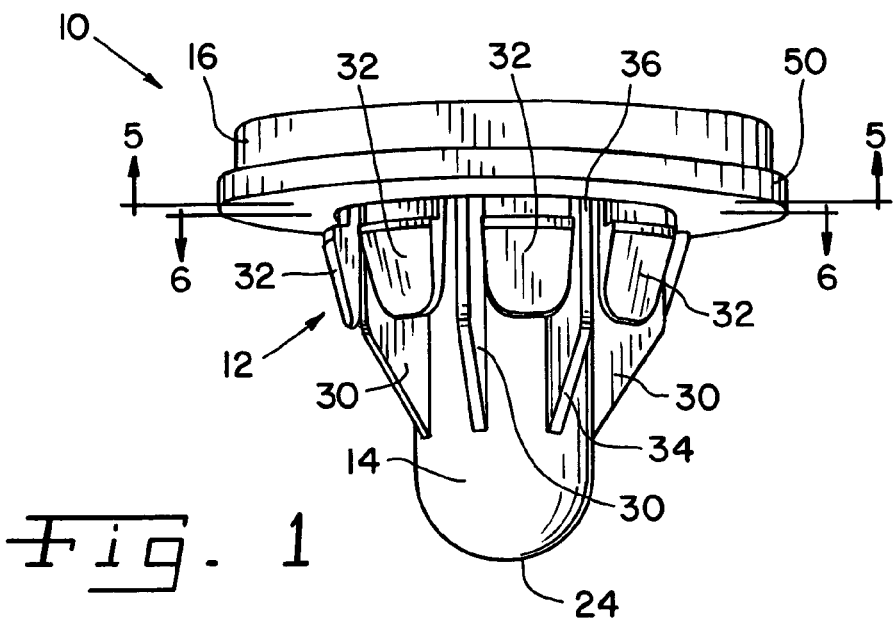
FIG. 1 is a perspective view of a grommet having an anchoring structure in accordance with the present invention.
Figure 2:
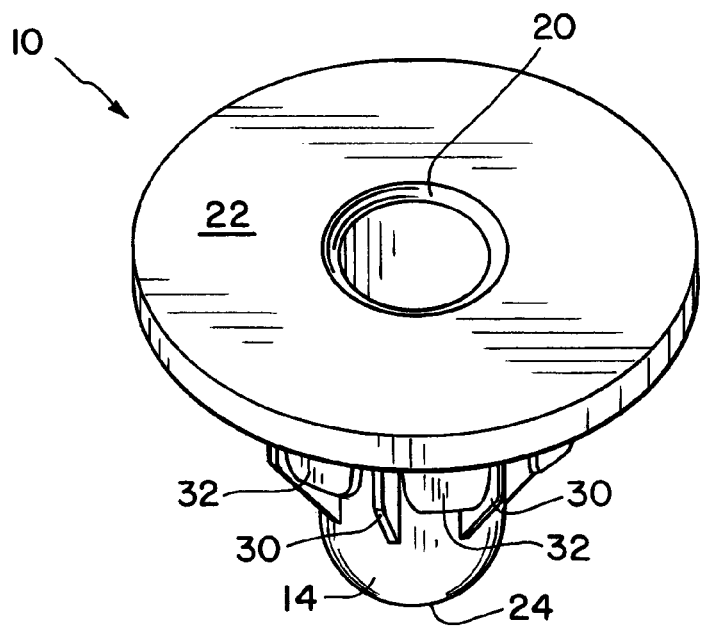
FIG. 2 is a perspective view of the grommet shown in FIG. 1, illustrating the top of the grommet as shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fastener, more specifically a grommet, and specifically a ball-stud anchoring grommet having an anchoring structure 12 in accordance with the present invention. While anchoring structure 12 is shown on a ball-stud grommet fastener 10, it should be understood that anchoring structure 12 can be used equally well on other types and sizes of fasteners or anchors 10. Further, fastener 10 can be made of a variety of materials including various metals and plastics, or may be made of a composite of materials in various molding techniques.

Grommet 10 includes a body 14 with a head 16 at one end thereof. A cavity 18 extends axially through body 14 and has an opening 20 thereto in an outer surface 22 of head 16. In the exemplary embodiment, body 14 includes a closed, rounded distal end 24 opposite head 16 and extends substantially axially from an under surface 26 of head 16. In variations of the present invention distal end 24 can be shaped otherwise, or may be open. Further, while body 14 is shown cylindrically shaped, body 14 can be tapered, or can be shaped with flat surfaces, as desired. As illustrated in the exemplary embodiment of the drawings, grommet 10 is an anchoring structure for a ball-stud of a headlamp or tail lamp assembly in a motor vehicle. Accordingly, cavity 18 defines one or more internal feature 28 for retaining a ball end of a ball-stud therein.

The present invention can be used equally well on other types of fasteners or structures having elongated or other shaped bodies 14. For example, body 14 can be threaded or threadable to receive a complementary threaded fastener, or body 14 can be otherwise configured for receiving fasteners and structures of other shapes, including various snap-together fasteners. While body 14 is illustrated in the exemplary embodiment extending from head 16 in the same direction as anchoring structure 12, body 14 and anchoring structure 12 can also extend in opposite directions, or otherwise angularly with respect to each other.

Anchoring structure 12 includes a plurality of ribs 30 and retention legs 32 provided in alternating arrangement one adjacent the other in a circle. Ribs 30 are connected to body 14 and to head 16 and thereby provide rigidity, functioning as gussets between head 16 and body 14 in fastener 10. It is also contemplated that in some structures and arrangements of the present invention ribs 30 may be connected to only one or the other of body 14 or head 16, or may be omitted entirely.

Each rib 30 includes an angular lead-in edge 34 extending outwardly from the external surface of body 14, and an exposed axial edge 36 extending between head 16 and lead-in edge 34. In embodiments in which ribs 30 are not connected to head 16, ribs 30 may terminate some distance spaced from head 16. Ribs 30 may terminate at the end of lead-in edge 34, thereby having no axial edge 36.

Retention legs 32 are connected to and extend substantially axially from head 16 in spaced relation to body 14. Retention legs 32 include a base 40, a distal edge 42 and a thickened middle 44. A lip 46 is defined between thickened middle 44 and base 40 and is disposed in confronting, spaced relationship to under surface 26 of head 16. An angular face 48 extends angularly outward from distal edge 42 to the outer edge of lip 46.

As seen most clearly in FIG. 4, distal edge 42 of retention leg 32 is inward slightly relative to the juncture of axial edge 36 and lead-in edge 34 of adjacent ribs 30. Accordingly, fastener 10 is smoothly self-centering in an opening in which it is installed. Rounded distal end 24 easily enters a hole in which fastener 10 is installed. The edge of a suitable hole can engage the outer surface of central body 14, and grommet 10 will become more accurately centered as lead-in edges 34 of one or more ribs 30 engage the perimeter of the opening. As fastener 10 is further inserted into the hole it becomes more accurately centered as lead-in edges 34 slide through the hole. A smooth transition occurs from lead-in edge or edges 34 to angular face or faces 48 of retention legs 32.

As fastener 10 is inserted still further, movement along angular faces 48 further centers the fastener until all angular faces 48 engage the perimeter of a circular hole. Since retention legs 32 extend from head 16 and are spaced from central body 14, each can deflect inwardly as necessary until the radially outer edges of lips 46 pass through the hole. Deflected retention legs 32 then rebound outwardly, trapping the panel between lips 46 and undersurface 26 of head 16. For more effective water or moisture tight engagement, an annular seal 50 can be provided adjacent head 16.

Retention legs 32, as best seen in FIG. 1, expose a broader face to the edge of a hole or slot in which fastener 10 is installed. On the other hand, ribs 30 provide a narrowed edge exposed to the perimeter of the hole or slot in which fastener 10 is installed. In the exemplary embodiment, eight ribs 30 and eight retention legs 32 are equally spaced about central body 14. Only minimal space is provided between adjacent ribs 30 and retention legs 32.

The circular arrangement of anchoring structure 12 is such that the orientation in an elongated slot is not of consequence relative to the secure attachment of fastener 10 within the slot. If opposite ribs 30 are positioned substantially transverse to the edge of a slot, at least portions of the two adjacent lips 46 engage the edge of the slot, and fastener 10 is securely held by portions of four retention legs, two each on opposite sides of anchoring structure 12. FIG. 6 illustrates fastener 10 installed in an elongated slot 60 in a plate 62. Slot 60 has opposed edges 64, 66 secured between under surface 26 and portions of two lips 46 on opposite sides of body 14.

Alternatively, if fastener 10 is oriented in an elongated slot such that opposite retention legs 32 are substantially along the edges of the slot, fastener 10 is still securely held by the lip of one leg on one side and the lip of another leg on the opposite side. Regardless of how fastener 10 is rotated, at least one lip 46 on one side and another lip 46 on the opposite side of fastener 10 engage the edges of the slot. Thus, regardless of the orientation, fastener 10 is securely held in a slot.

In the exemplary embodiment, eight ribs 30 and eight retention legs 32 are provided. Depending on the size of the hole in which it is installed and the size of fastener 10, fewer legs may be used or more than eight legs may be used. However, the number, size and positioning of legs 32, and particularly of lips 46 on legs 32, are such that regardless of the rotational position of fastener 10 continuous engagement is provided between the edge of a slot and lips 46 on diametrically opposite sides of anchoring structure 12.

Securing retention legs 32 to head 16 some spaced distance from central body 14 allows easier deflection of retention legs 32. Thus, fastener 10 can be installed relatively easily by hand, pushing on head 16 to force retention structure 12 into the hole or slot in which it is installed.

Fastener 10 is readily self-centering facilitating blind installation. Rounded distal end 24 easily locates and enters a hole or slot in which fastener 10 is to be installed. Smooth transition occurs between body 14 and lead-in edge 34 of ribs 30. Further, smooth transition occurs between lead-in edge 34 and angular face 48. Accordingly, to initiate attachment, only very gross positioning of fastener 10 is all that is required relative to a hole or slot in which it is installed. When used with headlamp adjusting structures, for example, fastener 10 as a ball-stud anchoring grommet 10 can be installed on a ball-stud, with a ball end thereof (not shown) held by internal feature 28 within cavity 18. When the lamp structure is installed in the automobile, fastener 10 is easily installed in a panel to which it is secured even if the hole or opening in the panel is not readily visible.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastening component securable in one of a circular hole and an elongated slot, said fastening component comprising:
   a central body;
   a head at one end of said body;
   a plurality of retention legs having lips disposed in confronting spaced relation to a surface of said head;
   said retention legs arranged in a circle;
   said plurality of retention legs being configured such that lips of at least a leg on one side and a leg on an opposite side of said plurality of legs engage edges of an opening receiving said fastening component for any rotational position of said fastening component, and
   ribs between adjacent legs of said plurality of legs, said ribs being configured to engage a perimeter of the opening that receives said fastening component.

2. The fastening component of claim 1, said legs connected to said head and spaced from said body.

3. The fastening component of claim 1, each said leg having a base connected to said head, a distal edge, and an angular face from said distal edge to said lip.

4. The fastening component of claim 1, said ribs connected to at least one of said head and said body.

5. The fastening component of claim 1, said ribs connected to each said head and said body.

6. The fastening component of claim 3, said ribs connected to at least one of said head and said body.

7. The fastening component of claim 6, said ribs connected to each said head and said body.

8. The fastening component of claim 1, including eight said legs in said plurality of legs.

9. The fastening component of claim 8, each said leg having a base connected to said head and a distal edge, and an angular face from said distal edge to said lip.

10. The fastening component of claim 8, including ribs between adjacent legs of said plurality of legs.

11. The fastening component of claim 10, each said leg having a base connected to said head and a distal edge, and an angular face from said distal edge to said lip.

12. The fastening component of claim 11, each said rib having a lead-in edge angling outwardly, with a portion thereof radially outward of distal edges of adjacent legs.

13. A ball-stud anchoring grommet securable in one of a circular hole and an elongated slot, said grommet comprising:
   a central body having a cavity and an internal feature for securing a ball end of a ball-stud;
   a head at one end of said body having an opening to said cavity;
   a plurality of retention legs, each having a lip disposed in confronting spaced relation to a surface of said head;
   said retention legs arranged in a circle around said body; and
   said plurality of retention legs being configured such that for any rotational position of said grommet lip of a leg on one side of said body and a lip of a leg on an opposite side of said body engage edges of an elongated opening receiving said grommet, and ribs between adjacent legs of said plurality of legs, said ribs being configured to engage a perimeter of the opening that receives said grommet.

14. The grommet of claim 13, including eight said legs in said plurality of legs.

15. The grommet of claim 13, each said leg having a base connected to said head and a distal edge, and an angular face from said distal edge to said lip.

16. The grommet of claim 13, each said rib having a lead-in edge angling outwardly, with a portion thereof radially outward of said distal edges of adjacent legs.

17. An anchoring structure for components securable in one of a circular hole and an elongated slot, said anchoring structure comprising:

a head;

a plurality of retention legs arranged in a circle and connected to said head, legs of said plurality of legs having a lip disposed in confronting spaced relation to a surface of said head;

said plurality of retention legs being configured such that for any rotational position of said anchoring structure, a lip of a leg on one side of said plurality of legs and lip of a leg on an opposite side of said plurality of legs engage opposite edges of slot receiving said anchoring structure, and ribs between adjacent legs of said plurality of legs, said ribs being configured to engage a perimeter of the slot that receives said anchoring structure.

18. The anchoring structure of claim 17, including eight said legs in said plurality of legs.

19. The anchoring structure of claim 18, each said leg having a base connected to said head and a distal edge, and a angular face from said distal edge to said lip.

20. The anchoring structure of claim 19, each said rib having a lead-in edge angling outwardly, with a portion thereof radially outward of said distal edges of adjacent legs.

* * * * *